United States Patent
Ramani et al.

(10) Patent No.: US 11,176,642 B2
(45) Date of Patent: Nov. 16, 2021

(54) SYSTEM AND METHOD FOR PROCESSING DATA ACQUIRED UTILIZING MULTI-ENERGY COMPUTED TOMOGRAPHY IMAGING

(71) Applicant: GE Precision Healthcare LLC, Wauwatosa, WI (US)

(72) Inventors: Sathish Ramani, Niskayuna, NY (US); Lin Fu, Niskayuna, NY (US); Bruno Kristiaan Bernard De Man, Wauwatosa, WI (US)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 204 days.

(21) Appl. No.: 16/505,870

(22) Filed: Jul. 9, 2019

(65) Prior Publication Data

US 2021/0012463 A1  Jan. 14, 2021

(51) Int. Cl.
  *G06T 5/00* (2006.01)
  *G06T 11/00* (2006.01)
  *G06N 20/10* (2019.01)

(52) U.S. Cl.
  CPC ............ *G06T 5/002* (2013.01); *G06N 20/10* (2019.01); *G06T 11/006* (2013.01); *G06T 2207/10081* (2013.01); *G06T 2207/20081* (2013.01)

(58) Field of Classification Search
  CPC combination set(s) only.
  See application file for complete search history.

(56) References Cited

U.S. PATENT DOCUMENTS

| | | | |
|---|---|---|---|
| 6,950,492 B2* | 9/2005 | Besson | A61B 6/4035 378/5 |
| 7,860,344 B1* | 12/2010 | Fitzpatrick | G06K 9/3241 382/291 |
| 8,515,097 B2* | 8/2013 | Nemer | H04R 3/00 381/94.1 |
| 8,942,975 B2* | 1/2015 | Borgstrom | G10L 21/0208 704/205 |
| 10,192,087 B2* | 1/2019 | Davis | G06Q 30/00 |
| 10,332,247 B2* | 6/2019 | Di Venuto Dayer, V | G06K 9/00093 |
| 10,824,049 B1* | 11/2020 | Yap | G02F 1/3544 |
| 10,839,488 B2* | 11/2020 | Bergner | G06F 17/16 |
| 2002/0173276 A1* | 11/2002 | Tschirk | G10L 21/0208 455/67.13 |
| 2004/0264626 A1* | 12/2004 | Besson | A61B 6/563 378/4 |
| 2012/0243797 A1* | 9/2012 | Di Venuto Dayer | G06K 9/3208 382/218 |
| 2013/0301380 A1* | 11/2013 | Oraevsky | A61B 8/5261 367/7 |
| 2018/0293762 A1* | 10/2018 | Fu | G06T 11/006 |

* cited by examiner

*Primary Examiner* — Anand P Bhatnagar
(74) *Attorney, Agent, or Firm* — Fletcher Yoder, P.C.

(57) ABSTRACT

A computer-implemented method for image processing is provided. The method includes acquiring multiple multi-energy spectral scan datasets and computing basis material images representative of multiple basis materials from the multi-energy spectral scan datasets, wherein the multiple basis material images include correlated noise. The method also includes jointly denoising the multiple basis material images in at least a spectral domain utilizing a deep learning-based denoising network to generate multiple de-noised basis material images.

24 Claims, 12 Drawing Sheets

SYSTEM AND METHOD FOR PROCESSING DATA ACQUIRED UTILIZING MULTI-ENERGY COMPUTED TOMOGRAPHY IMAGING

BACKGROUND

The subject matter disclosed herein relates to digital X-ray systems and, more particularly, to techniques for processing data (e.g., projection or image data) acquired utilizing multi-energy computed tomography imaging.

Non-invasive imaging technologies allow images of the internal structures or features of a subject (patient, manufactured good, baggage, package, or passenger) to be obtained non-invasively. In particular, such non-invasive imaging technologies rely on various physical principles, such as the differential transmission of X-rays through the target volume or the reflection of acoustic waves, to acquire data and to construct images or otherwise represent the internal features of the subject.

For example, in X-ray-based imaging technologies, a subject of interest, such as a human patient, is irradiated with X-ray radiation and the attenuated radiation impacts a detector where the attenuated intensity data is collected. In digital X-ray systems, a detector produces signals representative of the amount or intensity of radiation impacting discrete pixel regions of a detector surface. The signals may then be processed to generate an image that may be displayed for review.

In one such X-ray based technique, known as computed tomography (CT), a scanner may project fan-shaped or cone-shaped X-ray beams from an X-ray source from numerous view-angle positions on an object being imaged, such as a patient. The X-ray beams are attenuated as they traverse the object and are detected by a set of detector elements which produce signals representing the intensity of the attenuated X-ray radiation on the detector. The signals are processed to produce data representing the line integrals of the linear attenuation coefficients of the object along the X-ray paths. These signals are typically called "projection data" or just "projections". By using reconstruction techniques, such as filtered backprojection, images may be generated that represent a volume or a volumetric rendering of a region of interest of the patient or imaged object. In a medical context, pathologies or other structures of interest may then be located or identified from the reconstructed images or rendered volume.

Multi-energy CT imaging (e.g., spectral CT imaging) involves acquiring CT datasets at two or more different X-ray energy-spectra and performing multi-material decomposition on those datasets to obtain two or more material images (e.g., material decomposition images or basis material images) representative of multiple materials (water, iodine, calcium, etc.). A major challenge in noise reduction and artifact correction for the material images is the statistical correlation between these images. While noise in the acquired CT datasets may be statistically independent, the multi-material decomposition process yields (anti-)correlated noise in the resulting material images that may override an additional uncorrelated noise-component. The (anti-) correlated noise-component can be non-stationary both spatially and spectrally, making it difficult to design suitable whitening operators for noise-decorrelation before denoising. Due to the non-stationary nature of noise, even carefully designed analytical image-denoising algorithms may perform sub-optimally (e.g., over-correct or under-correct) often leading to undesirable texture artifacts (e.g., mixing of materials, material inaccuracy that could be misidentified as a physical/medical defect, etc.) in the process of denoising.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In accordance with an embodiment, a computer-implemented method for image processing is provided. The method includes acquiring multi-energy spectral scan datasets and computing multiple basis material images representative of multiple basis materials from the multi-energy spectral scan datasets, wherein the multiple basis material images include correlated noise. The method also includes jointly denoising the multiple basis material images in at least a spectral domain utilizing a deep learning-based denoising network to generate multiple de-noised basis material images.

In accordance with another embodiment, a one or more non-transitory computer-readable media are provided. The computer-readable media encode one or processor-executable routines. The one or more routines, when executed by a processor, cause acts to be performed including: acquiring multi-energy spectral scan datasets and computing multiple basis material images representative of multiple basis materials from the multi-energy spectral scan datasets, wherein the multiple basis material images comprise correlated noise, transforming the multiple basis material images to generate arbitrary basis images, jointly denoising the arbitrary basis images in a spectral domain and a three-dimensional (3D) spatial domain utilizing a deep learning-based denoising network to generate de-noised arbitrary basis images, and inverse transforming the de-noised arbitrary basis images to generate multiple de-noised basis material images.

In accordance with a further embodiment, a processor-based system is provided. The processor-based system includes a memory structure encoding one or more processor-executable routines. The routines, when executed cause acts to be performed including: acquiring multi-energy spectral scan datasets and computing multiple basis material images representative of multiple basis materials from the multi-energy spectral scan datasets, wherein the multiple basis material images comprise correlated noise, transforming the multiple basis material images to generate arbitrary basis images, jointly denoising the arbitrary basis images in a spectral domain and a three-dimensional (3D) spatial domain utilizing a deep learning-based denoising network to generate de-noised arbitrary basis images, and inverse transforming the de-noised arbitrary basis images to generate multiple de-noised basis material images The processor-based system also includes a processing component configured to access and execute the one or more routines encoded by the memory structure.

BRIEF DESCRIPTION OF THE DRAWINGS

These and other features, aspects, and advantages of the disclosed subject matter will become better understood when the following detailed description is read with reference to the accompanying drawings in which like characters represent like parts throughout the drawings, wherein.

DETAILED DESCRIPTION

Figure 1:
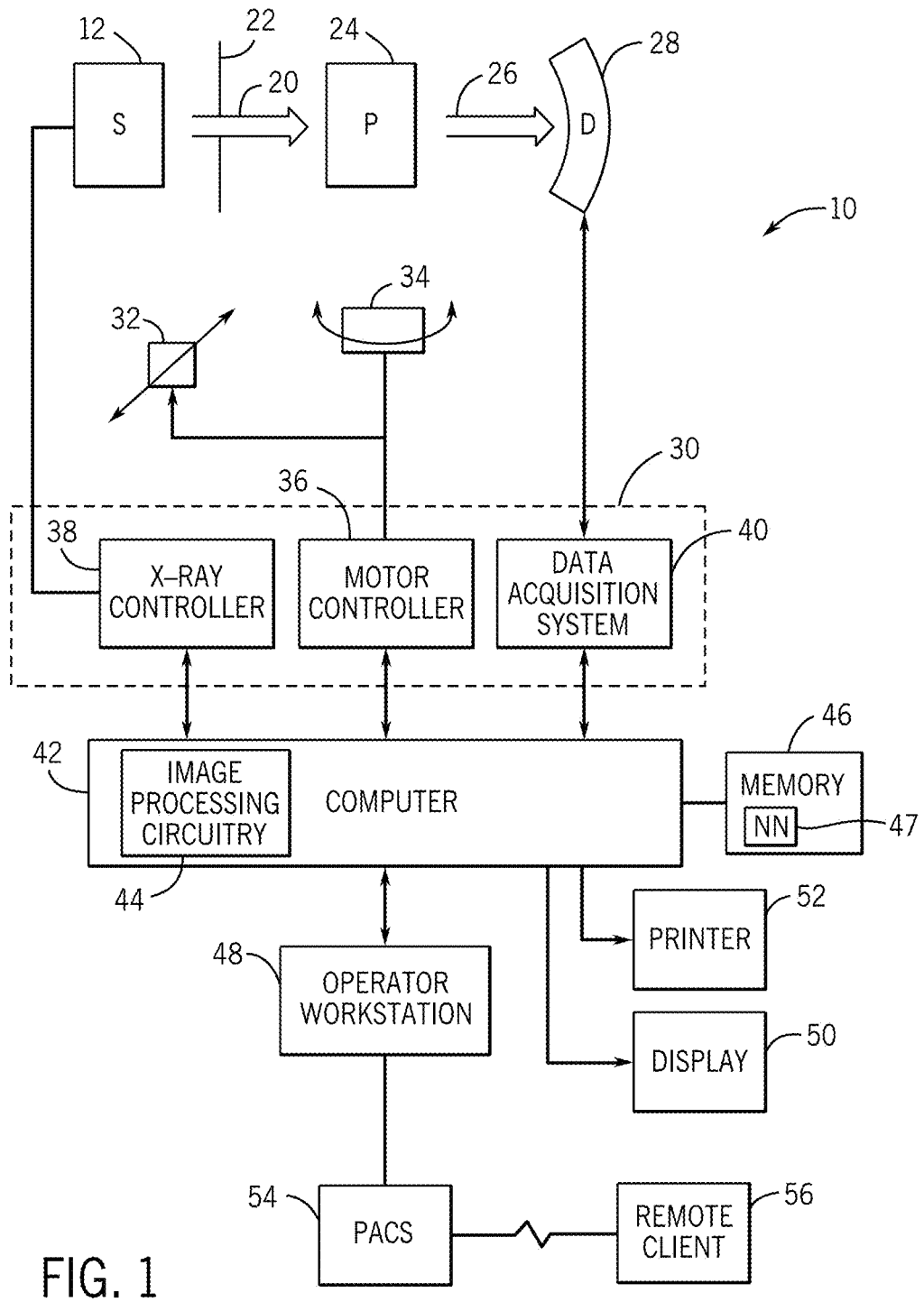
FIG. 1 is a schematic illustration of an embodiment of a computed tomography (CT) system configured to acquire CT images of a patient and process the images in accordance with aspects of the present disclosure.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

Deep-learning (DL) approaches discussed herein may be based on artificial neural networks, and may therefore encompass one or more of deep neural networks, fully connected networks, convolutional neural networks (CNNs), perceptrons, encoders-decoders, recurrent networks, wavelet filter banks, u-nets, general adversarial networks (GANs), or other neural network architectures. The neural networks may include shortcuts, activations, batch-normalization layers, and/or other features. These techniques are referred to herein as deep-learning techniques, though this terminology may also be used specifically in reference to the use of deep neural networks, which is a neural network having a plurality of layers.

As discussed herein, deep-learning techniques (which may also be known as deep machine learning, hierarchical learning, or deep structured learning) are a branch of machine learning techniques that employ mathematical representations of data and artificial neural networks for learning and processing such representations. By way of example, deep-learning approaches may be characterized by their use of one or more algorithms to extract or model high level abstractions of a type of data-of-interest. This may be accomplished using one or more processing layers, with each layer typically corresponding to a different level of abstraction and, therefore potentially employing or utilizing different aspects of the initial data or outputs of a preceding layer (i.e., a hierarchy or cascade of layers) as the target of the processes or algorithms of a given layer. In an image processing or reconstruction context, this may be characterized as different layers corresponding to the different feature levels or resolution in the data. In general, the processing from one representation space to the next-level representation space can be considered as one 'stage' of the process. Each stage of the process can be performed by separate neural networks or by different parts of one larger neural network.

Noise in material images in multi-energy or spectral computed tomography (CT) is non-stationary and (anti-) correlated making it difficult for conventional image denoising algorithms to effectively denoise them without producing undesirable artifacts. When material images are combined to create monochromatic images or are transformed to other physically-relevant representations such artifacts are compounded. It is therefore desirable to eliminate (anti)-correlated noise while together tackling its non-stationary nature and avoiding any residual artifacts in material images.

The present disclosure provides for methods and systems to reduce noise and artifacts in images acquired in multi-energy CT imaging (e.g., spectral CT imaging). In particular, an artificial intelligence (AI) based denoising framework for multi-material CT images (e.g., material decomposition images or basis material images) is provided that is configured to maintain clinically and/or practically desirable image appearance with fewer or no additional artifacts compared to traditional multi-material CT denoising methods. The denoising framework includes one or more neural networks (e.g., deep learning neural networks) trained and configured to jointly denoise (as well as treat independently) the material images that have (anti-)correlated noise in both the spatial and spectral domain. Thus, the denoising is not applied to a single material image in isolation. In other words, the input to a network is not a single scalar image, but a set of two (or more) material images (e.g., water-iodine or other suitable material decomposition image pairs) that have some correlation in their noise. The denoising framework may be utilized on projection data (e.g., projection volume) or image data (e.g. image volume). In certain embodiments, input vector images (e.g., such as similar to RGB channels) may be utilized. In certain embodiments, the output of the network may include the same number of images or the same vector dimension that corresponds to the denoised versions of the originals. Embodiments described may produce artifact- and noise-free material images, monochromatic images and other suitable spectral-representations with an appealing image texture preferred by practitioners.

With the foregoing discussion in mind, FIG. 1 illustrates an embodiment of an imaging system 10 for acquiring and processing image data in accordance with aspects of the present disclosure. In the illustrated embodiment, system 10 is a computed tomography (CT) system designed to acquire X-ray projection data, to reconstruct the projection data into a tomographic image, and to process the image data for display and analysis. The CT imaging system 10 includes an X-ray source 12. As discussed in detail herein, the source 12 may include one or more X-ray sources, such as an X-ray tube or solid-state emission structures. The X-ray source 12, in accordance with present embodiments, is configured to emit an X-ray beam 20 at one or more energies. For example, the X-ray source 12 may be configured to switch between relatively low energy polychromatic emission spectra (e.g., at about 80 kVp) and relatively high energy polychromatic emission spectra (e.g., at about 140 kVp). As will be appreciated, the X-ray source 12 may also be operated so as to emit X-rays at more than two different energies, though dual-energy embodiments are discussed herein to simplify explanation. Similarly, the X-ray source 12 may emit at polychromatic spectra localized around energy levels (i.e., kVp ranges) other than those listed herein. Indeed, selection of the respective energy levels for emission may be based, at least in part, on the anatomy being imaged and the chemical or molecules of interest for tissue characterization.

In certain implementations, the source 12 may be positioned proximate to a collimator 22 used to define the size and shape of the one or more X-ray beams 20 that pass into a region in which a subject 24 (e.g., a patient) or object of interest is positioned. The subject 24 attenuates at least a portion of the X-rays. Resulting attenuated X-rays 26 impact a detector array 28 formed by a plurality of detector elements. Each detector element produces an electrical signal that represents the intensity of the X-ray beam incident at the position of the detector element when the beam strikes the detector 28. Electrical signals are acquired and processed to generate one or more scan datasets.

A system controller 30 commands operation of the imaging system 10 to execute examination and/or calibration protocols and to process the acquired data. With respect to the X-ray source 12, the system controller 30 furnishes power, focal spot location, control signals and so forth, for the X-ray examination sequences. The detector 28 is coupled to the system controller 30, which commands acquisition of the signals generated by the detector 28. In addition, the system controller 30, via a motor controller 36, may control operation of a linear positioning subsystem 32 and/or a rotational subsystem 34 used to move components of the imaging system 10 and/or the subject 24. The system controller 30 may include signal processing circuitry and associated memory circuitry. In such embodiments, the memory circuitry may store programs, routines, and/or encoded algorithms executed by the system controller 30 to operate the imaging system 10, including the X-ray source 12, and to process the data acquired by the detector 28 in accordance with the steps and processes discussed herein. In one embodiment, the system controller 30 may be implemented as all or part of a processor-based system such as a general purpose or application-specific computer system.

The source 12 may be controlled by an X-ray controller 38 contained within the system controller 30. The X-ray controller 38 may be configured to provide power and timing signals to the source 12. In addition, in some embodiments the X-ray controller 38 may be configured to selectively activate the source 12 such that tubes or emitters at different locations within the system 10 may be operated in synchrony with one another or independent of one another. In certain embodiments, the X-ray controller 38 may be configured to provide fast-kVp switching of the X-ray source 12 so as to rapidly switch the source 12 to emit X-rays at the respective polychromatic energy spectra in succession during an image acquisition session. For example, in a dual-energy imaging context, the X-ray controller 38 may operate the X-ray source 12 so that the X-ray source 12 alternately emits X-rays at the two polychromatic energy spectra of interest, such that adjacent projections are acquired at different energies (i.e., a first projection is acquired at high energy, the second projection is acquired at low energy, the third projection is acquired at high energy, and so forth). In one such implementation, the fast-kVp switching operation performed by the X-ray controller 38 yields temporally registered projection data.

The system controller 30 may include a data acquisition system (DAS) 40. The DAS 40 receives data collected by readout electronics of the detector 28, such as sampled analog signals from the detector 28. The DAS 40 may then convert the data to digital signals for subsequent processing by a processor-based system, such as a computer 42. In other embodiments, the detector 28 may convert the sampled analog signals to digital signals prior to transmission to the data acquisition system 40. The computer may include processing circuitry 44 (e.g., image processing circuitry). The computer 42 may include or communicate with one or more non-transitory memory devices 46 that can store data processed by the computer 42, data to be processed by the computer 42, or instructions to be executed by a processor (e.g., processing circuitry 44) of the computer 42. For example, the processing circuitry 44 of the computer 42 may execute one or more sets of instructions stored on the memory 46, which may be a memory of the computer 42, a memory of the processor, firmware, or a similar instantiation. In accordance with present embodiments, the memory 46 stores sets of instructions that, when executed by the processor, perform image processing methods as discussed herein.

As discussed below, the memory 46 may also store instructions for the conversion of two or more polychromatic measurements to two or more material images (e.g., water-iodine or other suitable material) via multi-material decomposition and in turn generating two or more monochromatic images (e.g., one monochromatic image at an energy level) from two or more polychromatic image acquisitions. Generally stated, such an X-ray spectral imaging approach enables the generation of an image that would actually be produced from a (idealistic) monochromatic acquisition (i.e., imaging at a single energy-level) even though the actual X-ray emissions used to generate projection data are polychromatic in nature. The memory 46 also stores one or more algorithms and/or neural networks 47 that may be utilized in transformation/inverse transformation, denoising, and voting as described in greater detail below. For example, the neural networks 47 may include one or more deep learning-based denoising networks, deep learning-based transformation network, deep learning-based inverse transformation network, and/or a deep learning-based voting network.

The computer 42 may also be adapted to control features enabled by the system controller 30 (i.e., scanning operations and data acquisition), such as in response to commands and scanning parameters provided by an operator via an operator workstation 48. The system 10 may also include a display 50 coupled to the operator workstation 48 that allows the operator to view relevant system data, imaging parameters, raw imaging data, reconstructed data, contrast agent density maps produced in accordance with the present disclosure, and so forth. Additionally, the system 10 may include a printer 52 coupled to the operator workstation 48 and configured to print any desired measurement results. The display 50 and the printer 52 may also be connected to the computer 42 directly or via the operator workstation 48. Further, the operator workstation 48 may include or be coupled to a picture archiving and communications system (PACS) 54. PACS 54 may be coupled to a remote system 56, radiology department information system (RIS), hospital information system (HIS) or to an internal or external network, so that others at different locations can gain access to the image data.

Figure 2A:
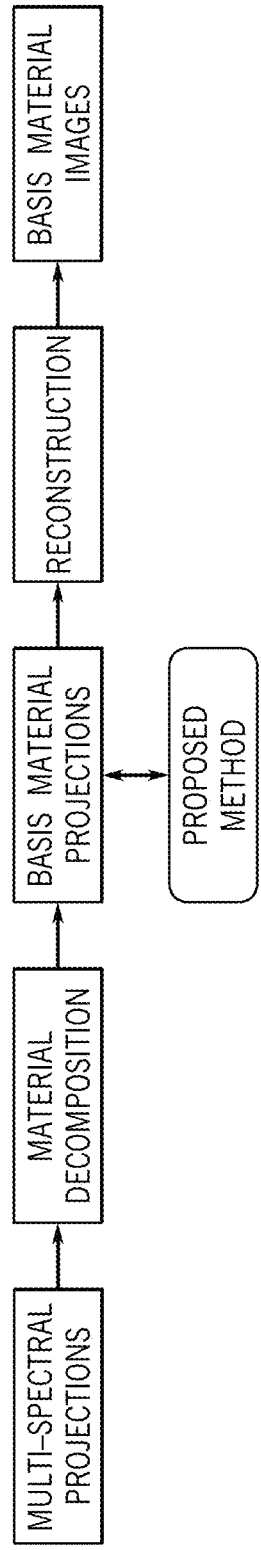
FIGS. 2A-2D illustrate different scenarios for the application of the disclosed denoising techniques or methods.
Figure 2B:
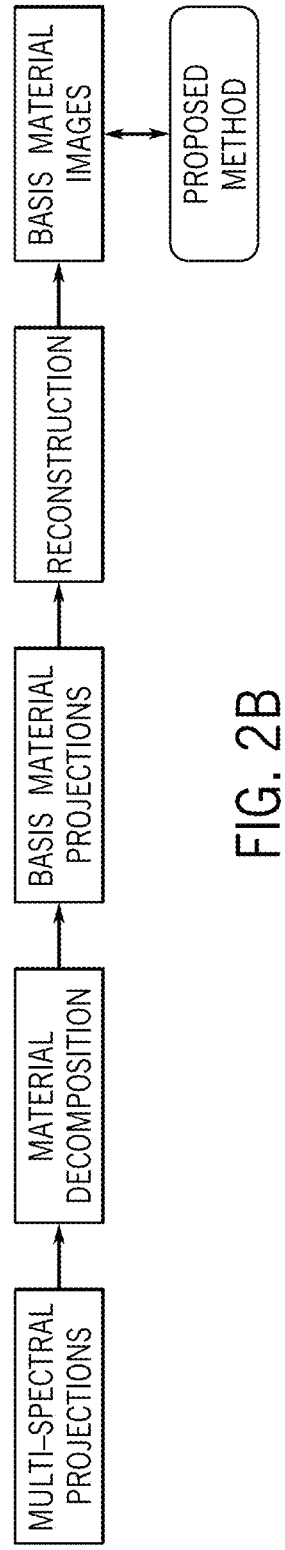
Figure 2C:
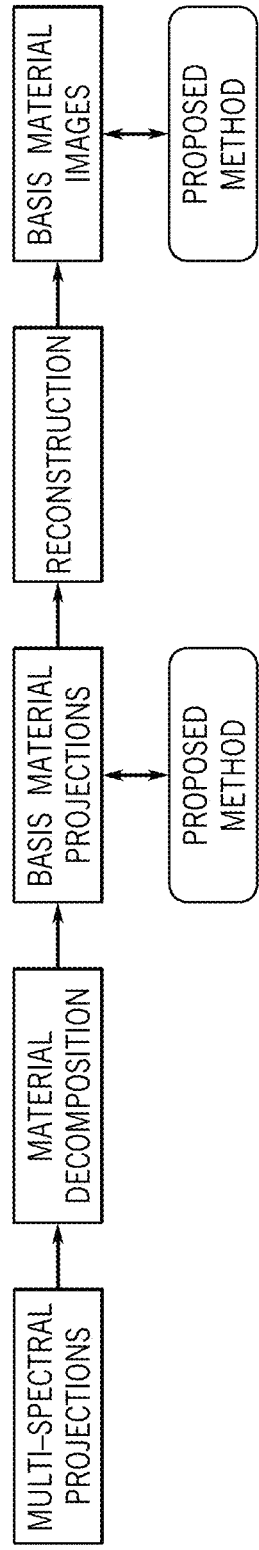
Figure 2D:

The following techniques described below are utilized on CT datasets acquired at two or more different X-ray energy-spectra and then multi-material decomposed. Although the following techniques are discussed with regard to the material images (e.g., material decomposition images or basis material images), the techniques may also be applied to the projection data or image volume or both. At least four different flavors of application of the proposed denoising method are envisioned here as illustrated in FIGS. 2A-2D. In FIGS. 2A-2C, the material decomposition is done in the projection domain, and the denoising is applied on the material-projection-images jointly (FIG. 2A), or on the material-reconstructed-images jointly (FIG. 2B) or on both the material-projection-images and material-reconstructed-images (FIG. 2C) with denoising of material-images in each domain being treated in a joint-fashion. In a different embodiment, the proposed method can also be applied to joint-denoising of material-reconstructed-images obtained from an image-domain material-decomposition step as indicated in FIG. 2D. The AI based denoising framework may include the following components: (1) one or more optional transformations of the vector of material images (or the material images) into a new set of bases that are more suitable for subsequent DL-based denoising, (2) one or more DL networks for joint denoising of the vector images (or material images), (3) one or more optional transformations to revert to the domain of the original material-vector (or material images), and (4) incorporation of prior knowledge about material images and/or transformations of the material images as part of the denoising process. In certain embodiments, denoising includes denoising all components of the noisy input vector (or material image) jointly together in addition to treating them individually. The first component reorganizes the material-image data into a domain where the noise component is more readily tractable. The second component takes advantage of texture-preserving and denoising capabilities of DL networks. In addition, the second component may operate on vector images since each voxel has multiple values corresponding to multiple materials, while the final component (i.e., prior information) further enhances DL-based denoising.

Figure 3:
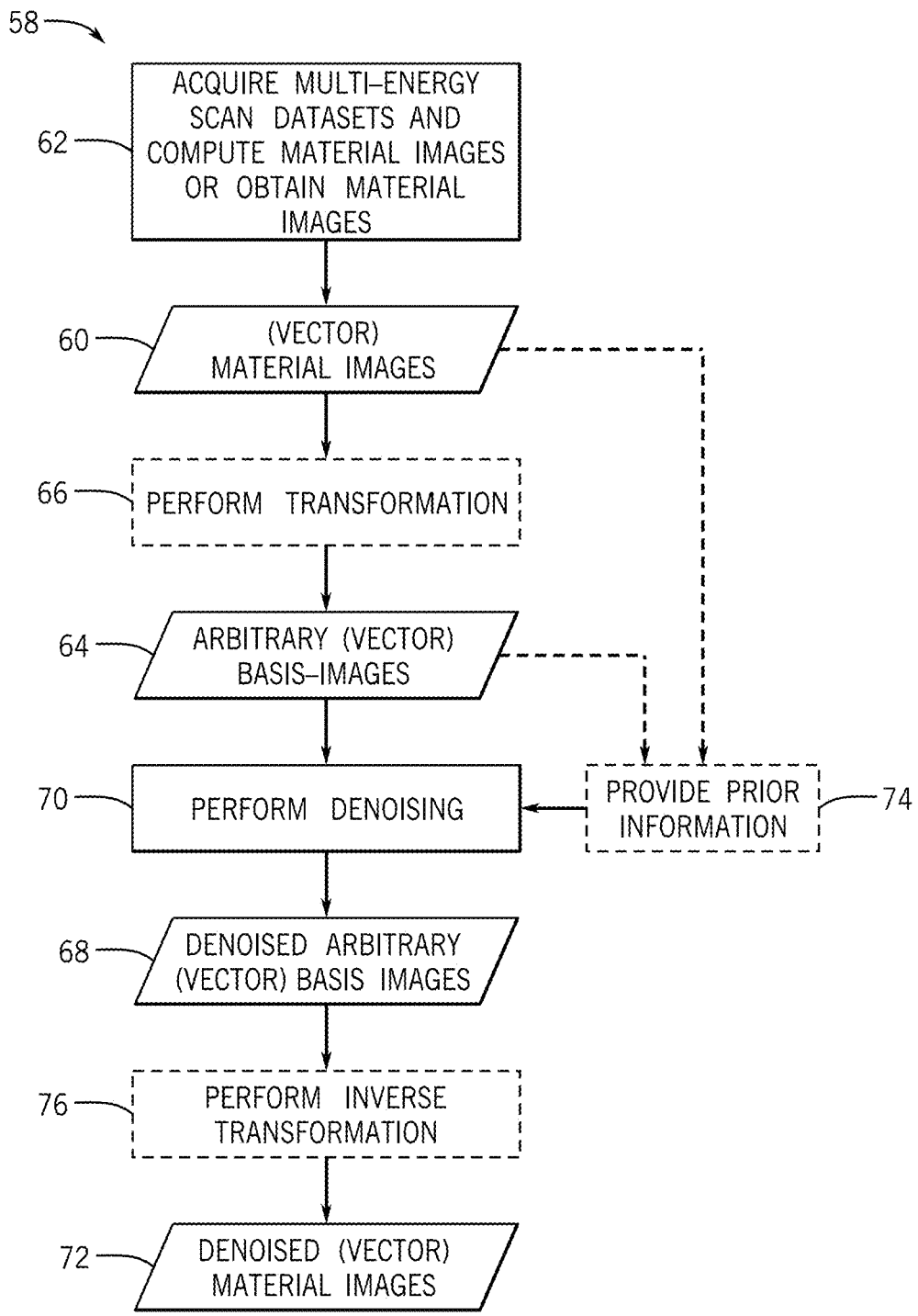
FIG. 3 is a flow chart for an embodiment of a method for processing image data, in accordance with aspects of the present disclosure.

FIG. 3 is a flow chart for an embodiment of a method 58 for processing image data, in accordance with aspects of the present disclosure. One or more of the steps of the method 58 may be performed by processing circuitry of the imaging system 10 or a remote processing device. The method 58 includes acquiring multi-energy scan datasets and reconstructing material images or obtaining material images (e.g., material decomposition images or basis material images) or vector images of the material images 60 (e.g., such as similar to RGB channels) (block 62).

In certain embodiments, the method 58 also includes performing transformation on the images 60 to generate arbitrary basis images or vector images of the arbitrary basis images 64 (block 66). For example, the L-length vector $m=(m_1, m_2, \ldots, m_L)$ of material-image-volumes first undergoes a transformation into a M-length vector $b=(b_1, b_2, \ldots, b_M)$ of arbitrary basis-image-volumes. In certain embodiments, the transformation may be specified by an analytical expression based on CT physics and noise statistics. In the simplest scenario, the transformation may be an identity transformation where the bases would be the material images themselves. Other transforms include conversion to monochromatic images or arbitrary linear combinations of material images based on local statistics, i.e., $b_i = \sum_{j=1}^{L} \alpha_{ij} m_j$, with $\alpha_{ij}$ being the linear transformation coefficient between $b_i$ and $m_1$, based on CT physics or noise statistics. In another embodiment, the transformation takes the form of a polynomial function, i.e., $b_i = \sum_{j=1}^{L} \sum_{k=0}^{K} \beta_{ijk} m_j^k$, where K is the order of the polynomial and is the polynomial coefficient between $b_i$ and $m_j$ for power k. More generally, if V is the number of voxels in each material volume, mathematically, the transformation may be represented as a mapping $f: R^{V \times L} \to R^{V \times M}$ that takes in a L-length vector of input volumes and produces a M-length vector of output volumes, i.e., $b=f(m)$, where the f can be linear or non-linear in nature and R is the field of real numbers. In practice, $M \geq L$, so as to produce an over-complete representation that provides enough flexibility to tackle the problem of (anti-) correlated noise reduction and artifact suppression. At the sophisticated end, the transformation could be a (linear or non-linear) DL network (e.g., deep learning-based transformation network) that, when properly trained, suitably represents the material-images for denoising. The transformation enables the noise to be spatially and materially decorrelated so as to enable relatively easy reduction or removal of it during denoising. In certain embodiments, the transformation may be applied prior to image reconstruction in the projection-domain.

The method 58 further includes performing denoising (e.g., via joint and individual treatment or processing) of the images 64 in the spectral and/or spatial domains utilizing a deep learning-based denoising network to generate a plurality of denoised arbitrary basis images or vectors of the denoised arbitrary basis images 68 (block 70). In embodiments where transformation is not performed prior, the denoising is performed on the material images (e.g., material decomposition images or basis material images) or vector images of the material images 60 to generate denoised material images or vector images of the material images 72. The denoising is described in greater detail below. In certain embodiments, the method 58 includes providing prior information related to the material images 60 and/or the transformation of the material images for the denoising (block 74). The prior information may include one or more of information related to edge preservation, spatial-sparsity, material-sparsity, and volume conservation. The prior information may be provided as landmarks or spatial maps. The prior information may also be derived from other images of the same patient or object (e.g. prior CT scan, MM scan, etc.).

In certain embodiments where the original images 60 are transformed, the method 58 includes performing inverse transformation on the denoised arbitrary basis images or vectors of the denoised arbitrary basis images 68 to generate the denoised material images or vector images of the material images 72 (block 76). The inverse transformation undoes the initial transformation of going from material-domain to the bases. In certain embodiments, the inverse transformation can also be a simple DL network (e.g., deep learning-based inverse transformation network) that maps N-length vector of DL output to M-length vector of material-images.

As mentioned above, the denoising (e.g., joint denoising as well as independent denoising) occurs in the spectral domain. In the DL-based denoising component, the M-length vector of basis-image-volumes is jointly denoised by one or more DL denoising networks to produce an N-length vector of output volumes. In practice, N≈M, that is, the lengths of the input and output vectors of the DL may be the same or very close and can be application specific where the DL-input and -output may correspond to the same (e.g., water and iodine at the input and output) or different clinically relevant representations (e.g., water and iodine at the input and water, calcium, and iodine at the output) of the original noisy materials.

Figure 4:
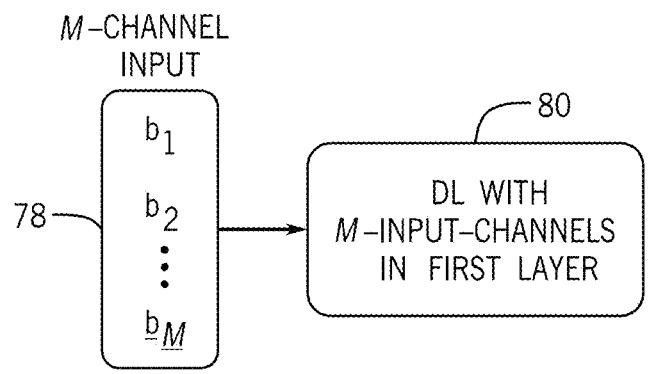
FIG. 4 is a schematic diagram of a deep learning denoising network for processing inputs (e.g., vector inputs), in accordance with aspects of the present disclosure.

Different types of embodiments for the construction of the DL denoising network are disclosed below for processing vector inputs and vector outputs (or image inputs and image outputs). FIG. 4 is a schematic diagram of a DL denoising network for processing inputs (e.g., vector inputs or image inputs). As depicted in FIG. 4, the M-length input vector b 78 is fed as M-channels of the first layer of a DL network 80. The M-channels are then jointly processed by the rest of the layers (intermediate layers) of the DL network 80. For example, in a fully connected layer, each output channel is connected to all input channels. In another example, in a convolutional layer, each output channel is connected to the filtered version of all input channels.

Figure 5:
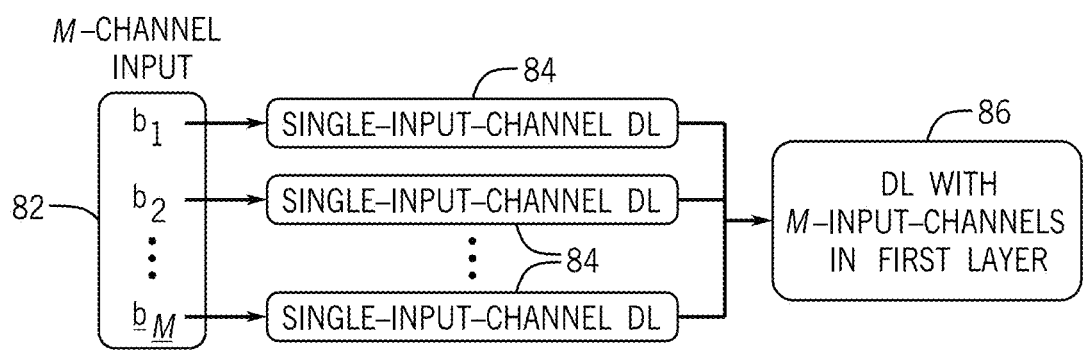
FIG. 5 is a schematic diagram of multiple deep learning denoising networks for processing inputs (e.g., vectors inputs), in accordance with aspects of the present disclosure.

FIG. 5 is a schematic diagram of multiple deep learning denoising networks for processing inputs (e.g., vectors inputs or image inputs). In this embodiment, each component $b_i$ of the M-length vector b 82 is individually fed to a respective single-input-channel DL network 84. Thus, there are a plurality of M single-input-channel DL networks 84. The output features of the M single-input-channel DL networks 84 are collected as an M-length vector and then jointly fed to a multi-input-channel DL network 86. Such a combination of single- and joint-channel DL processing may yield more powerful denoising performance than using either the single- or joint-channel processing alone.

Figure 6:
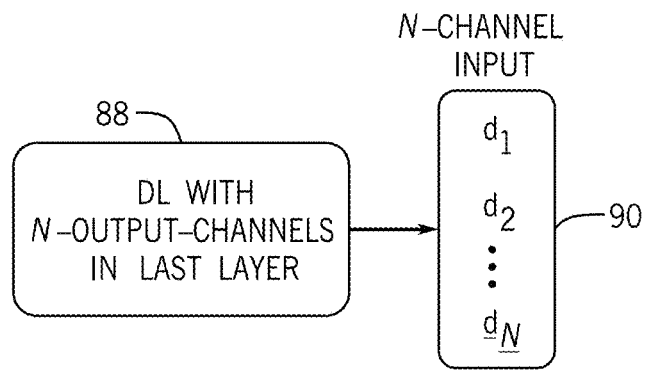
FIG. 6 is a schematic diagram of a deep learning denoising network for processing outputs (e.g., vector outputs), in accordance with aspects of the present disclosure.

At the output side, similar embodiments may be utilized. FIG. 6 is a schematic diagram of a deep learning denoising network for processing outputs (e.g., vector outputs or image outputs). As depicted in FIG. 6, a last layer of a DL network 88 includes N output channels that directly produces an N-channel output vector 90.

Figure 7:
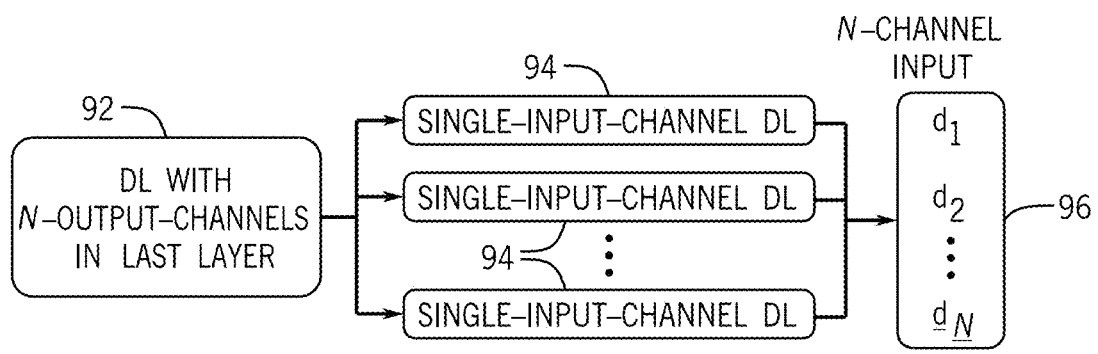
FIG. 7 is a schematic diagram of multiple deep learning denoising networks for processing outputs (e.g., vector outputs), in accordance with aspects of the present disclosure.

FIG. 7 is a schematic diagram of multiple deep learning denoising networks for processing outputs (e.g., vector outputs or image outputs). As depicted in FIG. 7, the N output channels of a DL network 92 are further processed individually by single-channel DL networks 94 whose outputs are then collated to form an N-length output vector 96. In different embodiments, the different input and output embodiments in FIGS. 4-7 may be combined for each DL denoising network utilized.

Figure 8:
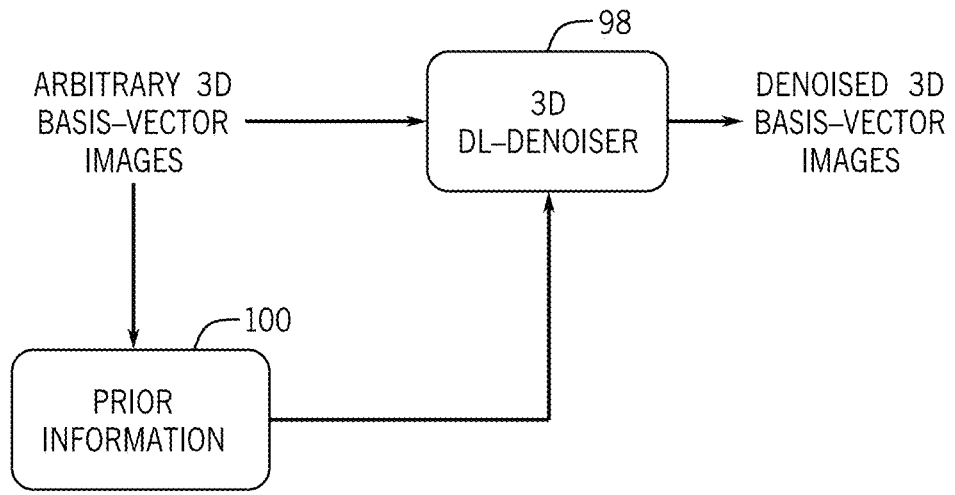
FIG. 8 is a schematic diagram illustrating the utilization of a three-dimensional (3D) deep learning denoising network for 3D spatial denoising, in accordance with aspects of the present disclosure.

In addition to joint processing of the spectral channels, it is also beneficial to have joint processing spatially in 3D. FIG. 8 is a schematic diagram illustrating the utilization of a three-dimensional (3D) deep learning denoising network 98 for 3D spatial denoising. As depicted in FIG. 8, the DL denoising network 98 operates on the whole M-length 3D input vector volume (e.g., using 3D filters) and produces an N-length 3D denoised output vector volume. In certain embodiments, as described above, prior information 100 related to the material images and/or the transformation of the material images may be utilized by the DL denoising network 98 to enhance denoising.

Figure 9:
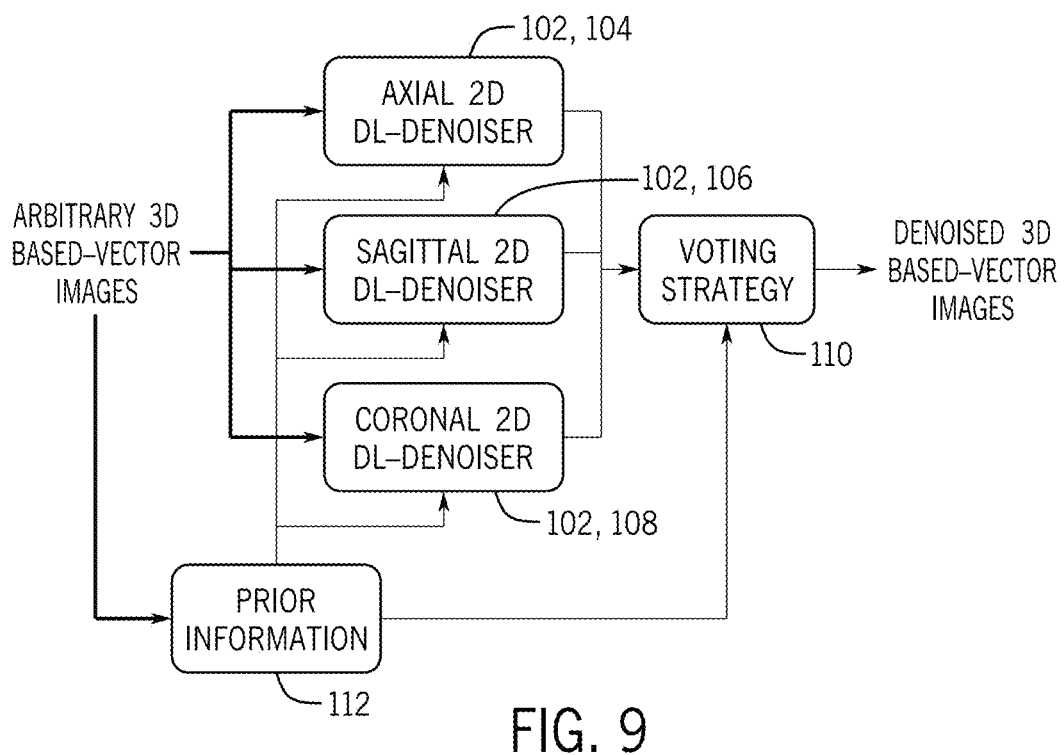
FIG. 9 is a schematic diagram illustrating the utilization of multiple two-dimensional (2D) deep learning networks (e.g., in a parallel arrangement) for 3D spatial denoising, in accordance with aspects of the present disclosure.

However, such spatial 3D processing may drastically increase the network size and make it difficult to train or implement the network. As an alternative, multiple 2D planar denoising may be utilized as a more efficient form of spatial 3D processing for multi-energy CT denoising. These techniques are used in combination with the DL networks in FIGS. 4-7 so that denoising is performed in both the spectral and 3D spatial domains. All denoisers using 2D multi-planar denoising may have computational advantage over pure 3D denoising (as depicted in FIG. 8), while being configured to leveraging relevant 3D structural and material information for denoising via voting mechanisms as discussed in greater detail below. FIG. 9 is a schematic diagram illustrating the utilization of multiple two-dimensional (2D) deep learning networks 102 (e.g., in a parallel arrangement) for 3D spatial denoising. A plurality of separate 2D DL denoising networks 102 may be utilized to operate along different spatial planes of the M-length input vector volume b, each producing an N-length output vector volume d. The different planes may be orthogonal with respect to each other. In certain embodiments, the different planes may be along standard orientations (e.g., axial, sagittal, or coronal) relative to the object imaged. In certain embodiments, the different planes may not be along the stand orientations but be arbitrarily orthogonally oriented. In embodiments utilizing planes that are arbitrarily orthogonally oriented, a reformatting (interpolation stage) may be utilized before and after the denoising, which may be useful for tilted scanner geometries. As depicted in FIG. 9, the networks 102 include an axial 2D DL denoising network 104, a sagittal 2D DL denoising network 106, and a coronal 2D DL denoising network 108 in a parallel arrangement.

As depicted in FIG. 9, a voting strategy 110 may be utilized to combine the outputs from the parallel DL networks 102 to produce the single N-length output vector volume. In certain embodiments, the voting strategy 110 may be utilized via a deep learning-based voting network. Prior information 112 as described above may be utilized to enhance both the denoising (e.g., at the individual network 102 level) and the voting mechanism. The voting strategy 110 may include taking voxel-wise mean or median over the outputs of the networks 104, 106, 108.

Figure 10:
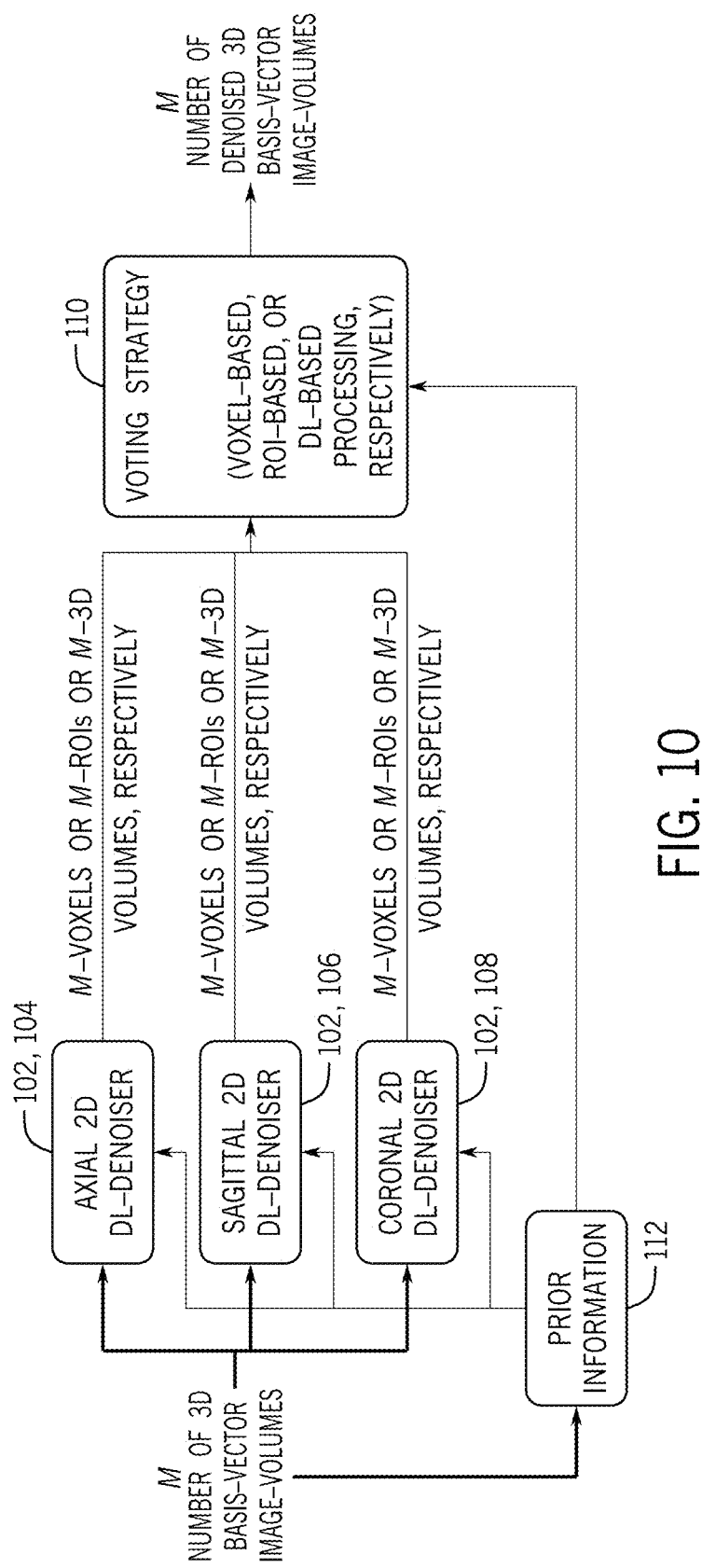
FIG. 10 is a schematic diagram illustrating the utilization of different voting strategies with the multiple 2D deep learning networks in FIG. 8.

Additional embodiments may utilize more sophisticated voting mechanisms that exploit the spatial-dimension and/or the channel-dimension. For example, in certain embodiments, the voting strategy 100 includes obtaining each N-length vector-voxel of the N-length output vector volume by jointly processing N-length vector voxels at the same voxel-location from the output of the parallel DL networks 102. In some embodiments, the voting strategy 100 includes obtaining each N-length vector-voxel of the N-length output vector volume by processing a 3D region of interest (ROI) centered at the same voxel-location from all N vector-component-volumes output from the parallel DL networks 102. The processing of voxels or ROIs may include traditional image-restoration methods such as bilateral filters, non-local mean, or other techniques. In other embodiments, the voting strategy 100 includes inputting the N-length vector-volumes output from all of the parallel DL networks to additional DL networks (e.g., with multi-channel or single-channel input and output layers similar to those described in FIGS. 4-7) that are trained to output a further enhanced N-length vector volume. The utilization of the different voting strategies 100 are illustrated in FIG. 10.

Figure 11:
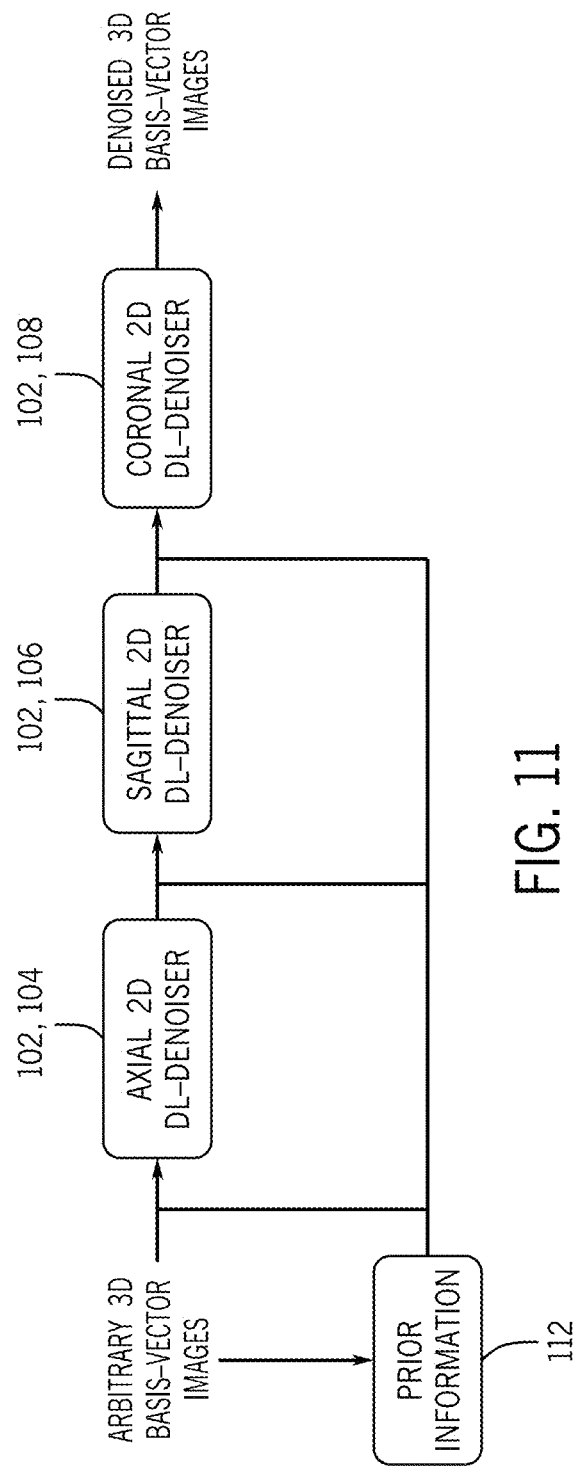
FIG. 11 is a schematic diagram illustrating the utilization of multiple 2D deep learning networks (e.g., in a sequential arrangement) for 3D spatial denoising, in accordance with aspects of the present disclosure.

FIG. 11 is a schematic diagram illustrating the utilization of multiple 2D DL networks 102 (e.g., in a sequential arrangement) for 3D spatial denoising. As depicted in FIG. 11, the 2D DL networks 104, 106, 108 along the different orthogonal planes operate in a sequential mode. The sequential order of the networks 104, 106, 108 may be permuted from that depicted in FIG. 11. Due to the sequential nature, it enables all permutations of the sequence to be considered, whose outputs can then be combined using a voting strategy similar to that discussed above with regard to FIGS. 9 and 10. As above, prior information 112 may be utilized to enhance both the denoising and the voting mechanism.

Figure 12:
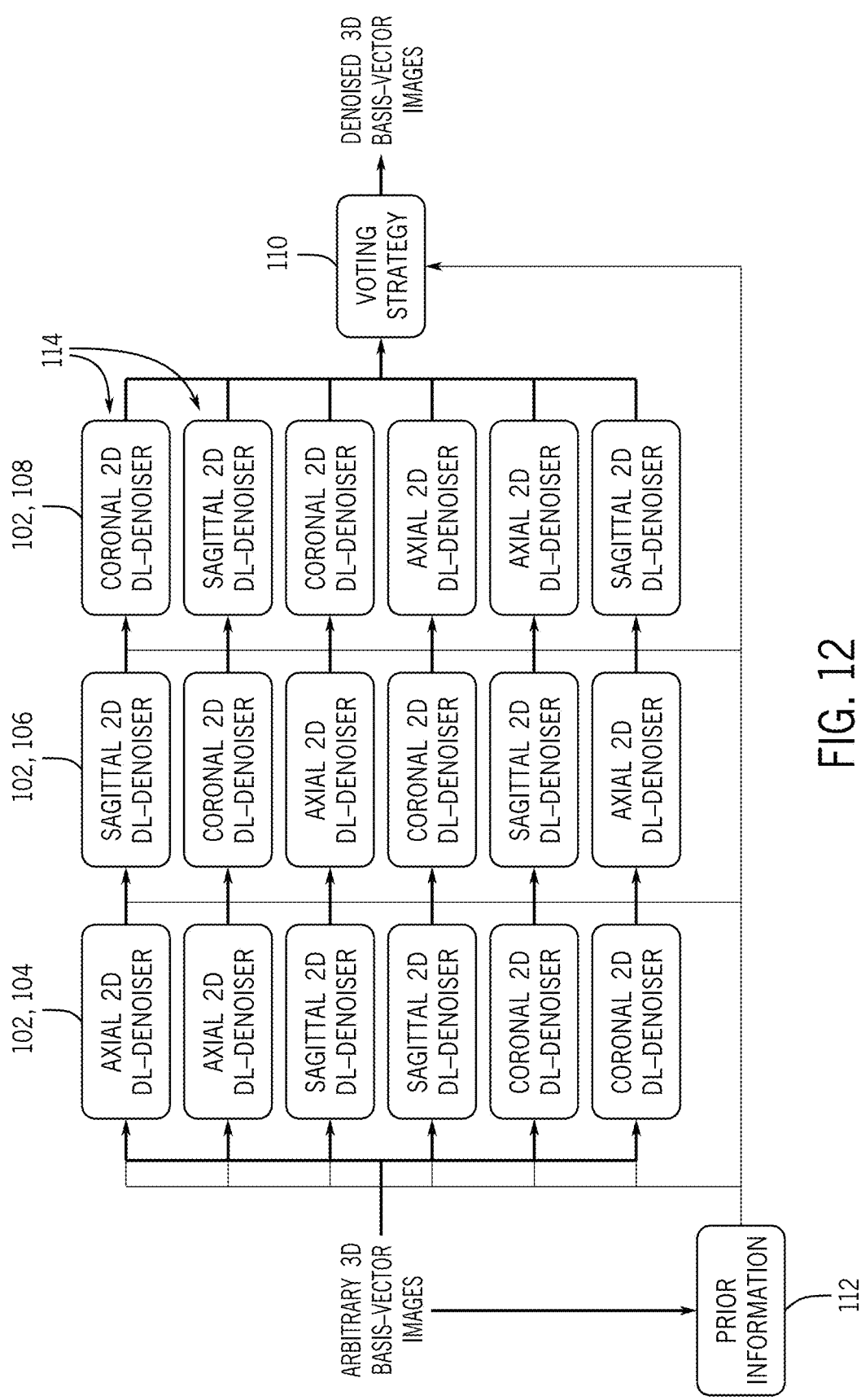
FIG. 12 is a schematic diagram illustrating the utilization of multiple 2D deep learning networks (e.g., in a hybrid sequential-parallel arrangement) for 3D spatial denoising, in accordance with aspects of the present disclosure.

FIG. 12 is a schematic diagram illustrating the utilization of multiple 2D DL networks 102 (e.g., in a hybrid sequential-parallel arrangement) for 3D spatial denoising. As depicted in FIG. 12, the 2D DL networks 102 include multiple rows 114 of the 2D DL networks 104, 106, 108 along the different orthogonal planes operating in a sequential mode, where the multiple rows 114 are in a parallel arrangement. As depicted in FIG. 12, the sequential order of the networks 104, 106, 108 may differ between at least some of the rows 114. The outputs of the rows 114 can then be combined using a voting strategy 110 similar to that discussed about with regard to FIGS. 9 and 10. As above, prior information 112 may be utilized to enhance both the denoising and the voting mechanism.

In all the embodiments described above, the DL networks (both in denoisers and in other components such as the first-step transformation and voting scheme) may be jointly trained to minimize a loss function, which typically describes some measure of distance between the noisy input training samples and corresponding noise-free ground-truth. Such training procedures may be termed as direct training. Alternatively, the DL networks may be trained to minimize some measure of distance between the noisy input training samples and the noise-component (e.g., residual) to be removed from them. Such training procedure may therefore be termed residual training. In all cases, loss functions can be defined in the image voxel space (for instance, squared-error, squared logarithmic error, or absolute error) or could be in the feature space (for instance, using a perceptual loss approach). In both direct and residual training modes, regularization-terms such as edge-preserving and/or sparsity-promoting regularizers may further be added numerically to the loss functions to guide and stabilize the training.

The multi-energy or multi-material CT images are usually different in their overall scaling or noise levels, depending on the CT acquisition parameters and the material bases. The difference can be up to several orders or magnitude and may cause unbalanced behavior in training. In all embodiments of the loss function, we can further include a multiplicative weighting factor to suitably prioritize the loss corresponding to different components of the N-length output vector. These weights may be obtained from CT physics and noise statistics. In certain embodiments, noisy input and corresponding noise-free or noise-only target labels for direct or residual training, respectively, can be obtained by noise-free numerical simulation or treating the high dose real data as noise-free ground-truths.

In one embodiment, all of the 2D DL denoising networks in the sequential mode are trained at once as a whole. This type of training may be computationally intensive and memory exhaustive. In another embodiment, each 2D denoising block is trained one at a time by freezing the weights of the already trained blocks when training subsequent blocks. The process is repeated until all the blocks are trained. This type of training may be more computational- and memory-efficient and may be easily automated. In another embodiment, the sequential blocks may be trained in a random block-wise iterative fashion where at each iteration a block at random is trained while freezing the weights of the rest of the blocks. This enables an already trained block to be improved further by iterative means. Under this embodiment, all the blocks need to be properly initialized to achieve meaningful results. The blocks can be initialized to a set of weights trained as described above.

Figure 13:
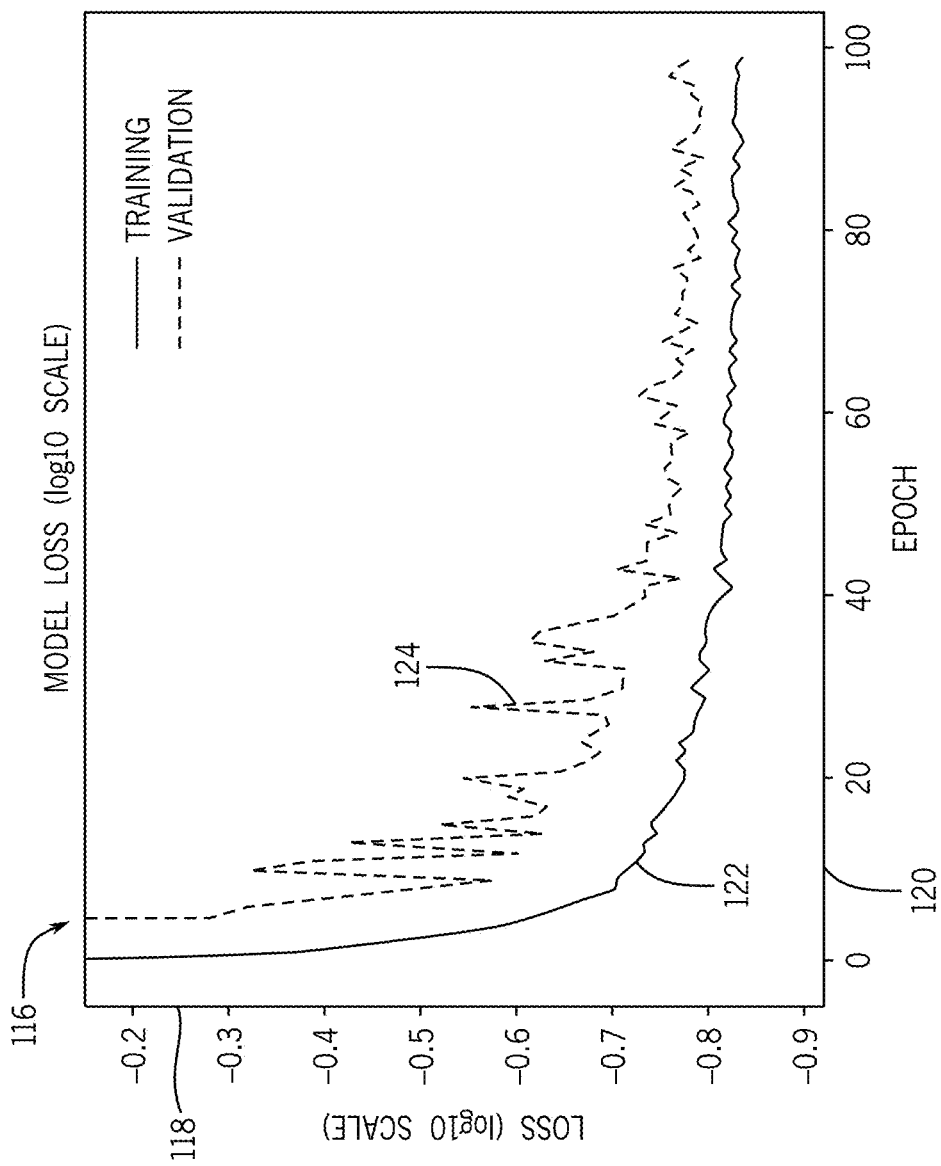
FIG. 13 is a graphical representation illustrating training and validation losses as a function of training epochs, in accordance with aspects of the present disclosure.

FIG. 13 is a graphical representation 116 illustrating losses (e.g., training and validation losses) as a function of training epochs. The techniques disclosed above were utilized in generating the graphical representation 116. The data in the graphical representation 116 was generated by utilizing a 17-layer sequential 2D CNN with two-channel convolutional input and output layers and identity transformations at the front and backend of the denoising chain described in FIG. 3. Each convolution layer had 64 feature-filters and the filter kernels were 3×3 in size. For generating training data, water, iodine image-pairs from a high-dose dual-energy patient dataset were defined as the ground-truth and corresponding noisy water, iodine image-pairs were generated by adding simulated material-noise to the ground-truth. The training targets/labels for residual learning were then obtained as the difference between the noisy images and the ground-truth. A similar strategy was used for generating validation datasets to test the accuracy of network training and to guard against over-fitting to training data. The network was trained with 41×41-sized patches of water, iodine pairs extracted from the noisy images and the training labels. The graphical representation 116 includes a y-axis 118 representing loss (in particular, the $L_2$ error or squared error) and an x-axis 120 representing epoch number. The plot 122 (solid) represents the data from training and the plot 124 (dashed) represents the data from validation. The validation $L_2$ loss as a function of training epochs in the graphical representation 116 indicates that the network has trained without overfitting the training data.

Figure 14:
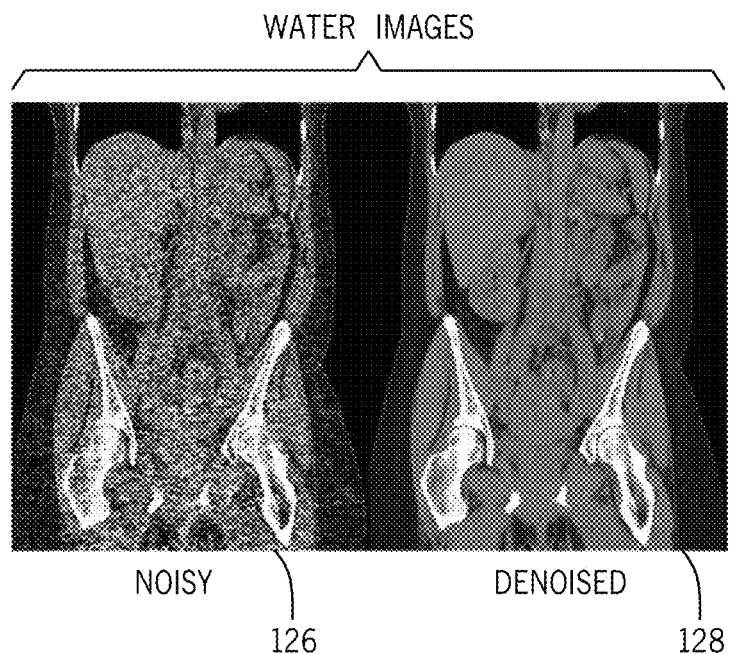
FIG. 14 illustrates a pair of water images (e.g., noisy water image versus a denoised water image), in accordance with aspects of the present disclosure.
Figure 15:
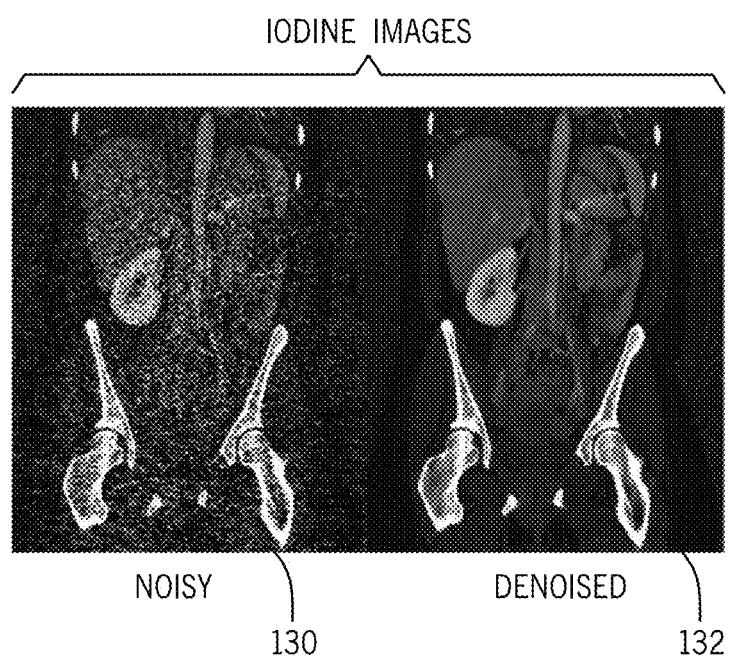
FIG. 15 illustrates a pair of iodine images (e.g., noisy iodine image versus a denoised iodine image), in accordance with aspects of the present disclosure.

FIGS. 14 and 15 illustrate the effects of utilizing the techniques disclosed above on a real dual-energy noise CT datasets from a patient. FIG. 14 illustrates a pair of water images (e.g., noisy water image 126 versus a denoised water image 128). FIG. 15 illustrates a pair of iodine images (e.g., noisy iodine image 130 versus a denoised iodine image 132). The techniques described above were applied to the noisy images 126, 130 (with the exception of transformation) to generate the denoised images 128, 132. A significant amount of the materially- and spatially-correlated noise has been reduced in the images, while preserving organ details in both the water and iodine material components.

Technical effects of the disclosed embodiments include providing a denoising framework that utilizes deep learning and includes one or more neural networks (e.g., deep learning neural networks) trained and configured to jointly denoise (as well as treat independently) the material images that have (anti-)correlated noise in both the spatial and spectral domain. The embodiments described above may produce artifact- and noise-free material images, monochromatic images, and other suitable spectral-representations with an image texture preferred by practitioners.

This written description uses examples to disclose the present subject matter, including the best mode, and also to enable any person skilled in the art to practice the present approaches, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer-implemented method for image processing, comprising:
    acquiring a plurality of multi-energy spectral scan datasets;
    computing basis material images representative of multiple basis materials from the multi-energy spectral scan datasets, wherein the plurality of basis material images comprise correlated noise; and
    jointly denoising the plurality of basis material images in at least a spectral domain utilizing a deep learning-based denoising network to generate a plurality of de-noised basis material images;
    wherein jointly denoising the plurality of basis material images comprises jointly denoising the plurality of basis material images in both the spectral domain and a three-dimensional (3D) spatial domain utilizing the deep learning-based denoising network to generate the plurality of de-noised basis material images.

2. The computer implemented method of claim 1, wherein the basis material images are projection-domain images obtained through at least a material decomposition step.

3. The computer implemented method of claim 1, wherein the basis material images are in the reconstruction domain and obtained through both at least a reconstruction step and a material decomposition step.

4. The computer-implemented method of claim 1, wherein the deep learning-based denoising network comprises a 3D deep-learning-based denoising network that is configured to jointly denoise the plurality of basis material images in the 3D spatial domain.

5. The computer-implemented method of claim 1, wherein the deep learning-based denoising network comprises a plurality of two-dimensional (2D) deep learning-based denoising networks that together is configured to jointly denoise the plurality of basis material images in the 3D spatial domain.

6. The computer-implemented method of claim 5, wherein at least some 2D deep learning-based denoising networks of the plurality of the 2D deep learning-based denoising networks are configured to operate along different spatial planes.

7. The computer-implemented method of claim 6, wherein the different spatial planes comprise different orthogonal planes.

8. The computer-implemented method of claim 7, wherein the different orthogonal planes comprise axial, sagittal, and coronal planes.

9. The computer-implemented method of claim 6, wherein the 2D deep learning-based denoising networks for the different spatial planes are configured to operate in parallel, sequentially, or both in parallel and sequentially.

10. The computer-implemented method of claim 6, wherein generating the plurality of de-noised basis material images comprises utilizing a voting strategy in combining outputs of the 2D deep learning-based denoising networks for the different spatial planes to generate the de-noised basis material images.

11. The computer-implemented method of claim 10, wherein the voting strategy in combining the outputs comprises utilizing a deep learning-based voting network in combining the outputs.

12. The computer-implemented method of claim 1, wherein the plurality of basis material images and the plurality of de-noised basis material images comprise vector images.

13. The computer-implemented method of claim 1, comprising transforming the plurality of basis material images to generate arbitrary basis images, jointly denoising the arbitrary basis images in at least the spectral domain utilizing the deep learning-based denoising network to generate de-noised arbitrary basis images, and inverse transforming the de-noised arbitrary basis images to generate the plurality of de-noised basis material images.

14. The computer-implemented method of claim 13, wherein the deep learning-based denoising network comprises a plurality of input channels in a first layer for inputting the arbitrary basis images, a plurality of output channels in a last layer for outputting the plurality of de-noised arbitrary basis images, and a plurality of intermediate layers between the plurality of input channels and the plurality of output channels for jointly processing the arbitrary basis images.

15. The computer-implemented method of claim 14, wherein the deep learning-based denoising network comprises a main deep learning-based denoising network comprising the plurality of input channels, the plurality of output channels, and the plurality of intermediate channels, and the deep learning-based denoising network comprises a plurality of single-input-channel deep-learning denoising networks, wherein each single-input-channel deep-learning denoising network comprises a single input channel for receiving and individually processing a different arbitrary basis image of the arbitrary basis images, and the main deep learning-based denoising network is configured to jointly receive outputs of the plurality of the single-input-channel deep-learning denoising networks.

16. The computer implemented method of claim 14, wherein the deep learning-based denoising network comprises a main deep learning-based denoising network comprising the plurality of input channels, the plurality of output channels, and the plurality of intermediate channels, and the deep learning-based denoising network comprises a plurality of single-input-channel deep-learning denoising networks, wherein each single-input-channel deep-learning denoising network comprises a single input channel for receiving and individually processing a different de-noised arbitrary basis image of the de-noised arbitrary basis images received from the main deep learning-based denoising network.

17. The computer-implemented method of claim 13, comprising utilizing a deep learning-based transformation network for transforming the plurality of basis material images and a deep learning-based inverse transformation network for inverse transforming the de-noised arbitrary basis images.

18. The computer-implemented method of claim 1, obtaining prior information about the plurality of basis material images and utilizing prior information in jointly denoising the plurality of basis material images in at least the spectral domain utilizing the deep learning-based denoising network to generate the plurality of de-noised basis material images.

19. The computer-implemented method of claim 18, wherein the prior information comprises information related to at least one of edge preservation, spatial-sparsity, material-sparsity, and volume conservation.

20. One or more non-transitory computer-readable media encoding one or more processor-executable routines, wherein the one or more routines, when executed by a processor, cause acts to be performed comprising:
   acquiring a plurality of multi-energy spectral scan datasets;
   computing basis material images representative of multiple basis materials from the multi-energy spectral scan datasets, wherein the plurality of basis material images comprise correlated noise;
   transforming the plurality of basis material images to generate arbitrary basis images;
   jointly denoising the arbitrary basis images in a spectral domain and a three-dimensional (3D) spatial domain utilizing a deep learning-based denoising network to generate de-noised arbitrary basis images; and
   inverse transforming the de-noised arbitrary basis images to generate a plurality of de-noised basis material images.

21. A processor-based system, comprising:
   a memory structure encoding one or more processor-executable routines, wherein the routines, when executed cause acts to be performed comprising:
      acquiring a plurality of multi-energy spectral scan datasets;
      computing basis material images representative of multiple basis materials from the multi-energy spectral scan datasets, wherein the plurality of basis material images comprise correlated noise;
      transforming the plurality of basis material images to generate arbitrary basis images;
      jointly denoising the arbitrary basis images in a spectral domain and a three-dimensional (3D) spatial domain utilizing a deep learning-based denoising network to generate de-noised arbitrary basis images; and
      inverse transforming the de-noised arbitrary basis images to generate a plurality of de-noised basis material images; and
   a processor configured to access and execute the one or more routines encoded by the memory structure.

22. A computer-implemented method for image processing, comprising:
   acquiring a plurality of multi-energy spectral scan datasets;
   computing basis material images representative of multiple basis materials from the multi-energy spectral scan datasets, wherein the plurality of basis material images comprise correlated noise;
   transforming the plurality of basis material images to generate arbitrary basis images;
   jointly denoising the arbitrary basis material images in at least a spectral domain utilizing a deep learning-based denoising network to generate de-noised arbitrary basis images; and
   inverse transforming the de-noised arbitrary basis images to generate a plurality of de-noised basis material images;
   wherein the deep learning-based denoising network comprises a plurality of input channels in a first layer for inputting the arbitrary basis images, a plurality of output channels in a last layer for outputting the de-noised arbitrary basis images, and a plurality of intermediate layers between the plurality of input channels and the plurality of output channels for jointly processing the arbitrary basis images.

23. One or more non-transitory computer-readable media encoding one or more processor-executable routines, wherein the one or more routines, when executed by a processor, cause acts to be performed comprising:
   acquiring a plurality of multi-energy spectral scan datasets;
   computing basis material images representative of multiple basis materials from the multi-energy spectral scan datasets, wherein the plurality of basis material images comprise correlated noise; and
   jointly denoising the plurality of basis material images in at least a spectral domain utilizing a deep learning-based denoising network to generate a plurality of de-noised basis material images;
   wherein jointly denoising the plurality of basis material images comprises jointly denoising the plurality of basis material images in both the spectral domain and a three-dimensional (3D) spatial domain utilizing the deep learning-based denoising network to generate the plurality of de-noised basis material images.

24. A processor-based system, comprising:
   a memory structure encoding one or more processor-executable routines, wherein the routines, when executed cause acts to be performed comprising:
      acquiring a plurality of multi-energy spectral scan datasets;
      computing basis material images representative of multiple basis materials from the multi-energy spectral scan datasets, wherein the plurality of basis material images comprise correlated noise; and
      jointly denoising the plurality of basis material images in at least a spectral domain utilizing a deep learning-based denoising network to generate a plurality of de-noised basis material images;
      wherein jointly denoising the plurality of basis material images comprises jointly denoising the plurality of basis material images in both the spectral domain and a three-dimensional (3D) spatial domain utilizing the deep learning-based denoising network to generate the plurality of de-noised basis material images; and
   a processor configured to access and execute the one or more routines encoded by the memory structure.

* * * * *